United States Patent
Chuang

(10) Patent No.: US 8,983,837 B2
(45) Date of Patent: Mar. 17, 2015

(54) ALERT MODE MANAGEMENT METHOD AND COMMUNICATION DEVICE HAVING ALERT MODE MANAGEMENT FUNCTION

(71) Applicant: Hon Hai Precision Industry Co., Ltd., New Taipei (TW)

(72) Inventor: Tsung-Jen Chuang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 156 days.

(21) Appl. No.: 13/706,414

(22) Filed: Dec. 6, 2012

(65) Prior Publication Data
US 2013/0262115 A1    Oct. 3, 2013

(30) Foreign Application Priority Data

Mar. 30, 2012 (TW) ................................ 101111261

(51) Int. Cl.
| | |
|---|---|
| *G10L 17/00* | (2013.01) |
| *G10L 15/00* | (2013.01) |
| *G10L 15/22* | (2006.01) |
| *H04M 19/04* | (2006.01) |
| *G10L 25/48* | (2013.01) |

(52) U.S. Cl.
CPC ............. *G10L 15/00* (2013.01); *G10L 15/22* (2013.01); *G10L 25/48* (2013.01); *G10L 2015/223* (2013.01); *H04M 19/04* (2013.01)
USPC ........................ 704/246; 704/272; 704/247

(58) Field of Classification Search
USPC ............. 704/272–275, 231, 247, 243, 246; 381/57; 702/189; 455/550.1; 379/38; 340/506
See application file for complete search history.

(56) References Cited

U.S. PATENT DOCUMENTS

| | | | |
|---|---|---|---|
| 2003/0179887 A1* | 9/2003 | Cronin | 381/57 |
| 2005/0084075 A1* | 4/2005 | Kotzin | 379/38 |
| 2007/0192067 A1* | 8/2007 | Wong et al. | 702/189 |
| 2009/0253454 A1* | 10/2009 | Sampson | 455/550.1 |
| 2009/0295562 A1* | 12/2009 | Shuster | 340/506 |

* cited by examiner

*Primary Examiner* — Huyen X. Vo
(74) *Attorney, Agent, or Firm* — Novak Druce Connolly Bove + Quigg LLP

(57) ABSTRACT

A computerized alert mode management method of a communication device, the communication device includes a sound capture unit. Vocal sounds of the environment around the communication device are extracted at regular intervals using the sound capture unit. Voice characteristic information of the captured vocal sounds is extracted using a speech recognition method and/or a voice recognition method. The communication device is controlled to work at one of a plurality of predetermined alert modes according to the extracted voice characteristic information.

8 Claims, 3 Drawing Sheets

ALERT MODE MANAGEMENT METHOD AND COMMUNICATION DEVICE HAVING ALERT MODE MANAGEMENT FUNCTION

BACKGROUND

1. Technical Field

Embodiments of the present disclosure relate to the field of communication devices, and in particular, to an alert mode management method of communication device.

2. Description of Related Art

Many communication devices, such as mobile phones, may work at a preset alert mode according to a user's requirements. However, the user may forget to set the alert mode when he/she goes from one environment to the next, thereby missing urgent and important events (e.g., incoming calls). For example, an incoming call may be missed when the user walks along a loud street and the communication device is still in quiet mode. In another example, if the user forgets to change the alert mode to a vibration mode or a quiet mode before the user attends a meeting, the ring tones may interrupt the meeting. Therefore, there is room for improvement in the art.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one."

Figure 1:
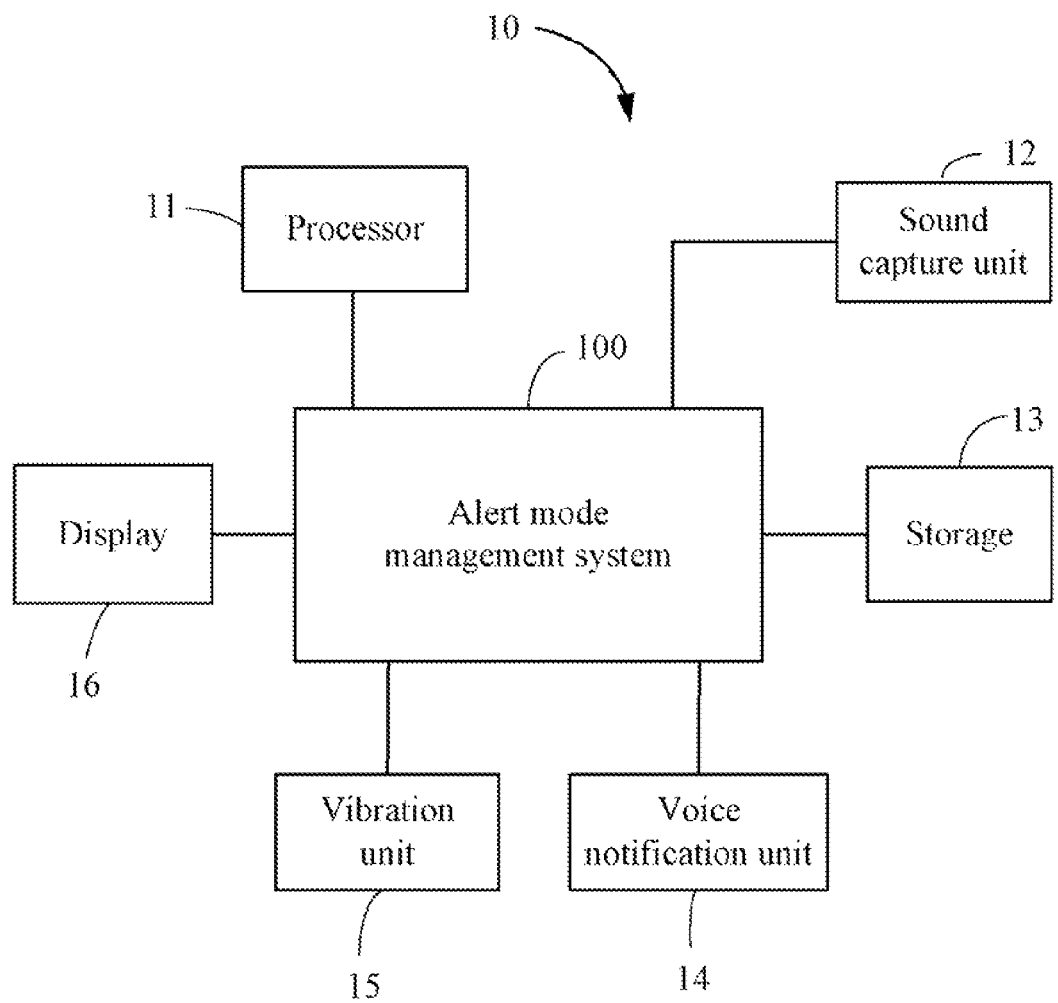
FIG. 1 is a block diagram illustrating one embodiment of a communication device including an alert mode management system.

FIG. 1 is a block diagram illustrating one embodiment of a communication device 10. The communication device 10 includes an alert mode management system 100, a processor 11, a sound capture unit 12, a storage 13, a voice notification unit 14, a vibration unit 15, and a display 16. In the embodiment, the communication device 10 can work at different alert modes, such as a normal mode, a driving mode, a movie mode, and a meeting mode. Each of the alert modes corresponds to at least one predetermined method for prompting a user when the communication device 10 receives an incoming event (e.g., incoming call, clock, text message). For example, if the communication device 10 works at the driving mode, the voice notification unit 14 may play a ringtone at a high level volume and the vibration unit 15 may be triggered to vibrate when an incoming call is received by the communication device 10. If the communication device 10 works at the meeting mode, the ringtone may be disabled and only vibration may be activated to notify the user when the incoming call is received by the communication device 10. If the communication device 10 works at the normal mode, only a predetermined ringtone at a middle level volume may be played to notify the user when the incoming call is received by the communication device 10. The communication device 10 may be, for example, a mobile phone, a personal digital assistant, or other similar device. FIG. 1 shows one example of the communication device 10, and the communication device 10 can include more or fewer components than shown in the embodiment, or have a different configuration of the components.

Figure 2:
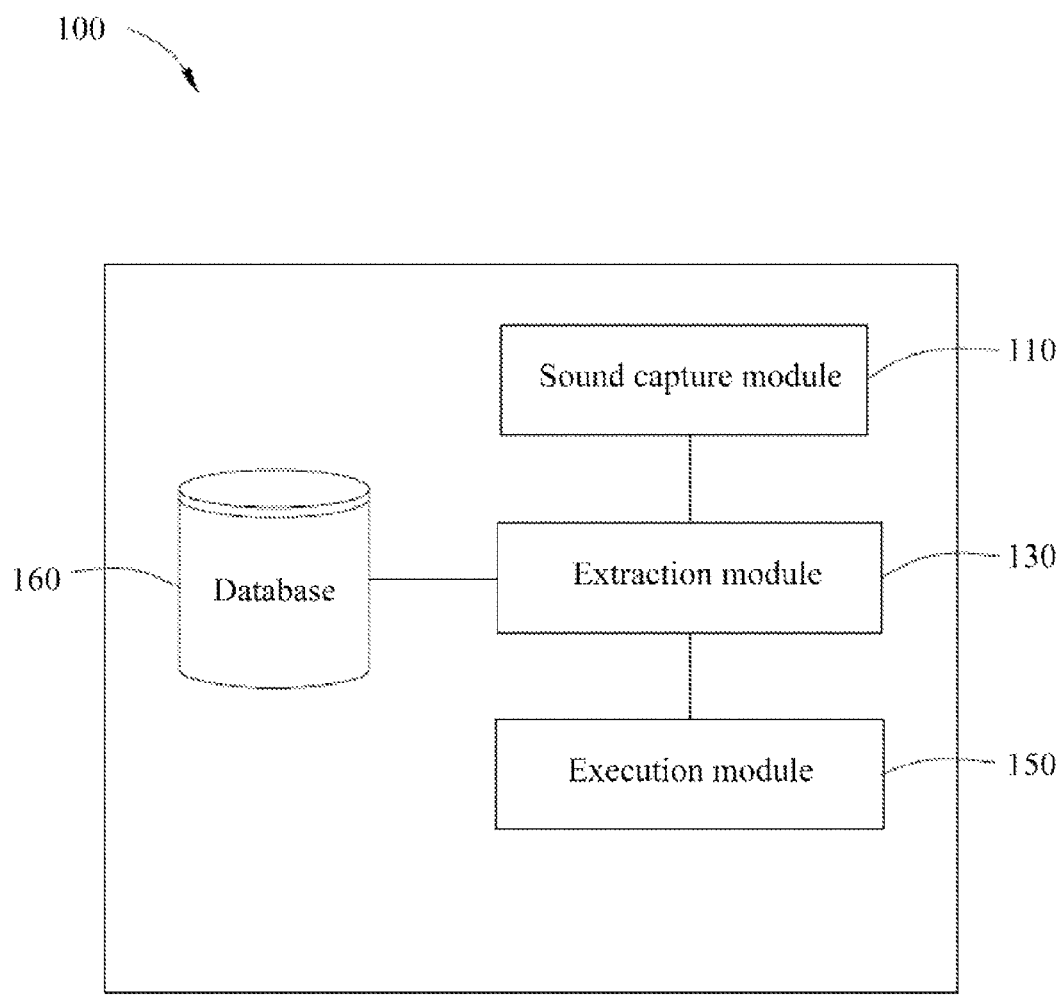
FIG. 2 is a schematic diagram of functional modules of the alert mode management system of FIG. 1.

The alert mode management system 100 may include a plurality of programs in the form of one or more computerized instructions stored in the storage 13 and executed by the processor 11 to perform operations of the communication device 10. In the embodiment, referring to FIG. 2, the alert mode management system 100 includes a sound capture module 110, an extraction module 130, an execution module 150, and a database 160. In general, the word "module," as used herein, refers to logic embodied in hardware or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or hardware modules and may be stored in any type of non-transitory computer-readable medium or other storage devices. Some non-limiting examples of non-transitory computer-readable medium include CDs, DVDs, BLU-RAY, flash memory, and hard disk drives.

The sound capture module 110 captures vocal sounds of environment around the communication device 10 using the sound capture unit 12 at regular intervals, such as one or second minutes. The sound capture unit 12 may be a microphone, for example.

The extraction module 130 extracts voice characteristic information of the captured vocal sounds using a speech recognition method and/or a voice recognition method. In the embodiment, the voice characteristic information includes spoken words, voice prints, and/or voice frequencies which are extracted from the captured vocal sounds using a speech recognition method and/or a voice recognition method. The voice prints may refer to spectrogram of the captured vocal sounds, which can be extracted from the captured vocal sounds using the voice recognition method. The spoken words may come from people within the environment around the communication device 10, which can be extracted from the captured vocal sounds using the speech recognition method. The voice frequencies refer to vibration frequencies of the captured vocal sounds, which can be extracted using the voice recognition method.

The execution module 150 controls the communication device 10 to work at one of the alert modes according to the extracted voice characteristic information. In the embodiment, one or more predetermined voice characteristics corresponding to each of the alert modes are prestored in the database 160. For example, as shown in the following table, a plurality of predetermined spoken words, such as "meeting," "report," and "schedule," may be prestored in the database 160 corresponding to the meeting mode. Predetermined voice prints of echoes, explosion noise, and a plurality of background music are prestored in the database 160 corresponding to the movie mode. Predetermined voice prints and voice frequencies of whistles are prestored in the database 160 corresponding to the driving mode. None of the particular voice characteristics (Null) may be prestored corresponding to the normal mode. The execution module 150 may compare the extracted voice characteristic information with the voice characteristics of each of the alert modes, and then control the communication device 10 to work at one of the alert modes that the voice characteristics match with the extracted voice characteristic information.

| Alert mode | voice characteristics |
|---|---|
| Meeting mode | Spoken words: "meeting," "report," and "schedule" |
| Movie mode | Voice prints of echoes, explosion noise, and a plurality of music |
| Driving mode | Voice prints and voice frequencies of whistle |
| Normal mode | Null |

Figure 3:
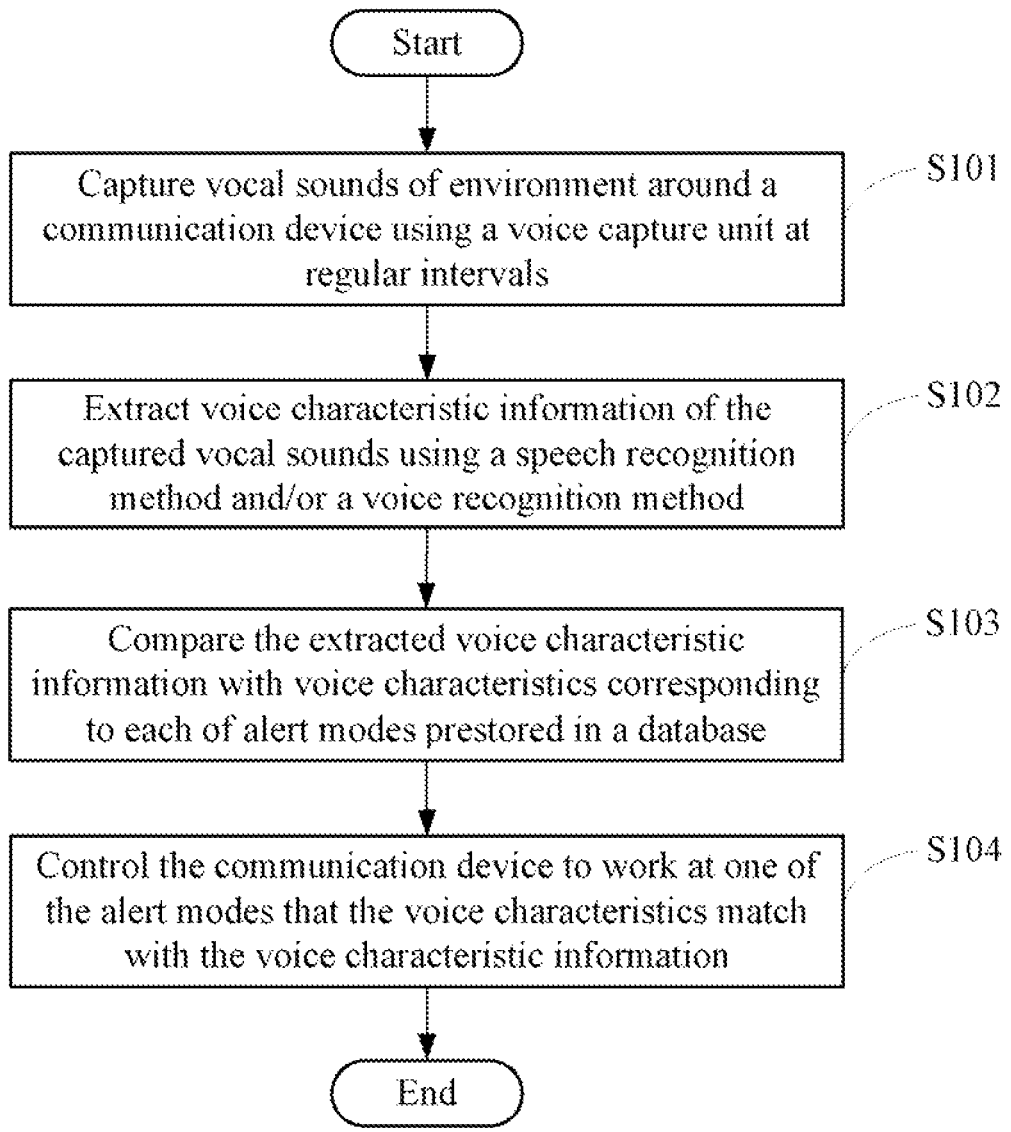
FIG. 3 is a flowchart of one embodiment of an alert mode management method of the communication device of FIG. 1.

FIG. 3 shows a flowchart of one embodiment of an alert mode management method of the communication device 10 of FIG. 1. Depending on the embodiment, additional steps may be added, others removed, and the ordering of the steps may be changed.

In step S101, the sound capture module 110 captures vocal sounds of environment around the communication device 10 using the sound capture unit 12 at regular intervals.

In step S102, the extraction module 130 extracts voice characteristic information of the captured vocal sounds using a speech recognition method and/or a voice recognition method.

In step S103, the execution module 150 compares the extracted voice characteristic information with the voice characteristics corresponding to each of the alert modes pre-stored in the database 160.

In step S104, the execution module 150 controls the communication device 10 to work at one of the alert modes that the voice characteristics match with the extracted voice characteristic information.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A communication device, comprising:
    a sound capture unit;
    a storage;
    a processor; and
    one or more programs stored in the storage and executed by the processor, the one or more programs comprising:
    a sound capture module that captures vocal sounds of environment around the communication device using the sound capture unit at regular intervals;
    an extraction module that extracts voice characteristic information of the captured vocal sounds using a speech recognition method and/or a voice recognition method;
    an execution module that controls the communication device to work at one of a plurality of predetermined alert modes according to the extracted voice characteristic information, the plurality of predetermined alert modes comprising a meeting mode, a movie mode, a driving mode, and a normal mode; and
    a database that stores one or more predetermined voice characteristics corresponding to each of the alert modes, wherein the database stores a plurality of predetermined spoken words corresponding to the meeting mode, predetermined voice prints of echoes, explosion noise, and a plurality of background music corresponding to the movie mode, and predetermined voice prints and voice frequencies of whistles corresponding to the driving mode.

2. The communication device according to claim 1, wherein the execution module further compares the extracted voice characteristic information with the voice characteristics of each of the alert modes, and controls the communication device to work at one of the alert modes that the voice characteristics match the extracted voice characteristic information.

3. The communication device according to claim 1, wherein the voice characteristic information comprise spoken words, voice prints, and voice frequencies extracted from the captured vocal sounds.

4. The communication device according to claim 1, wherein each of the alert modes corresponds to at least one predetermined method for prompting a user using a vibration unit and/or a voice prompting unit of the communication device when the communication device receives an incoming event.

5. An alert mode management method of a communication device, comprising:
    storing one or more predetermined voice characteristics corresponding to each of a plurality of predetermined alert modes in a database of the communication device, wherein the plurality of predetermined alert modes comprise a meeting mode, a movie mode, a driving mode, and a normal mode, the database stores a plurality of predetermined spoken words corresponding to the meeting mode, predetermined voice prints of echoes, explosion noise, and a plurality of background music corresponding to the movie mode, and predetermined voice prints and voice frequencies of whistles corresponding to the driving mode;
    capturing, by a processor of the communication device, vocal sounds of environment around the communication device at regular intervals using a sound capture unit of the communication device;
    extracting, by the processor, voice characteristic information of the captured vocal sounds using a speech recognition method and/or a voice recognition method; and
    controlling, by the processor, the communication device to work at one of a plurality of predetermined alert modes according to the extracted voice characteristic information.

6. The method according to claim 5, wherein the controlling step comprises:
    comparing the extracted voice characteristic information with the voice characteristics of each of the alert modes; and
    controlling the communication device to work at one of the alert modes that the voice characteristics match with the extracted voice characteristic information.

7. The method according to claim 5, wherein the voice characteristic information comprise spoken words, voice prints, and voice frequencies extracted from the captured vocal sounds.

8. The method according to claim 5, wherein each of the alert modes corresponds to at least one predetermined method for prompting a user using a vibration unit and/or a voice prompting unit of the communication device when the communication device receives an incoming event.

* * * * *